United States Patent [19]
Lehtola

[11] Patent Number: 4,499,989
[45] Date of Patent: Feb. 19, 1985

[54] METHOD AND DEVICE FOR TURNING A LONG

[75] Inventor: Erkki T. Lehtola, Böle, Finland

[73] Assignee: Tahka Oy, Kaskinen, Finland

[21] Appl. No.: 375,748

[22] Filed: May 6, 1982

[30] Foreign Application Priority Data

May 8, 1981 [FI] Finland .................. 811417

[51] Int. Cl.³ ............................................ B65G 47/24
[52] U.S. Cl. ..................................... 198/407; 198/400
[58] Field of Search ................ 198/400, 407; 414/748, 414/745

[56] References Cited

U.S. PATENT DOCUMENTS

| | | | |
|---|---|---|---|
| 3,960,267 | 6/1976 | Valo | 198/400 |
| 4,078,651 | 3/1978 | Ekholm et al. | 198/400 |

FOREIGN PATENT DOCUMENTS

| | | | |
|---|---|---|---|
| 218534 | 1/1968 | Finland | 198/400 |
| 37074 | 7/1968 | Finland . | |
| 59571 | 2/1977 | Finland . | |
| 576259 | 10/1977 | U.S.S.R. | 198/400 |
| 571420 | 10/1977 | U.S.S.R. | 414/748 |

Primary Examiner—Joseph E. Valenza
Assistant Examiner—Kyle E. Shane
Attorney, Agent, or Firm—Cushman, Darby & Cushman

[57] ABSTRACT

The invention relates to a method and device for turning a log. In the method, the turning is carried out in two stages in such a way that the first stage comprises the turning of the log to a somewhat oblique position in relation to the transverse direction of two rollers (2) rotating in opposite directions, and the second stage comprises the turning of the log by means of the rollers in a controlled manner onto a conveyor (11), which is at the bottom of a trough (14). The device according to the invention has two rollers (2) rotating in opposite directions and, adjacent to each roller, a preferably V-shaped blade (3), which effects the first stage of the turning. The second stage of turning, effected by the rollers (2), is controlled, a factor which provides a considerable improvement in efficiency.

1 Claim, 2 Drawing Figures

U.S. Patent   Feb. 19, 1985   4,499,989
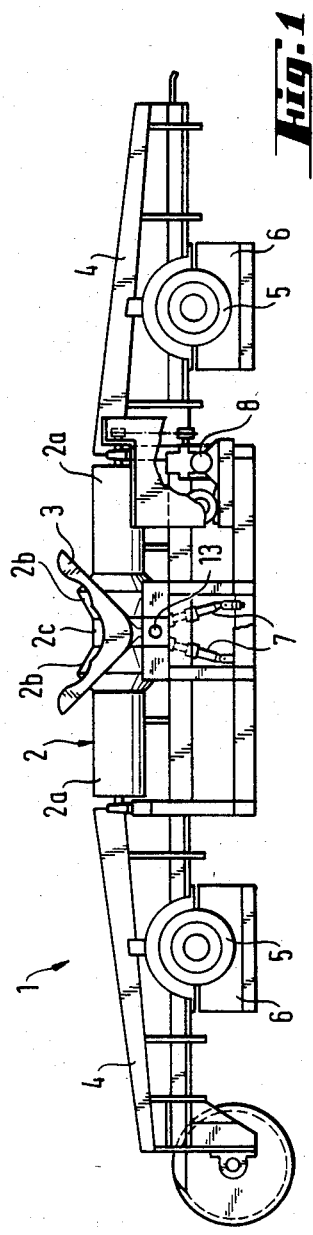
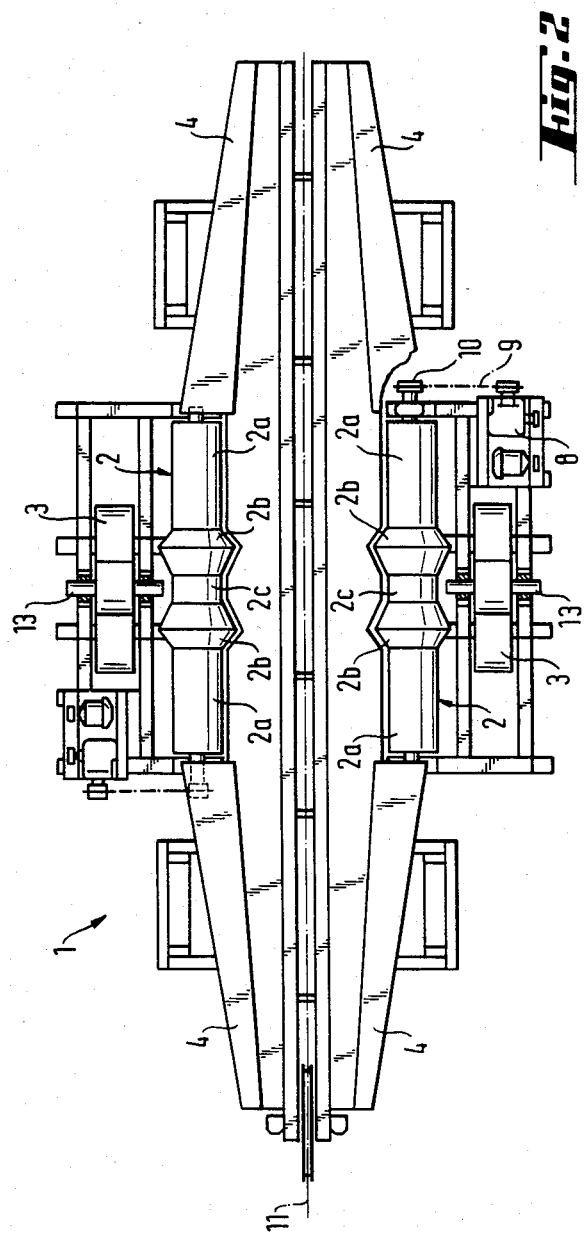

METHOD AND DEVICE FOR TURNING A LONG

The present invention relates to a method and device by means of which it is possible to change the travel direction of a log, in general through approximately a right angle, whereafter the log continues its journey on a conveyor running in the said direction.

The turning device most commonly used so far is one in which the turning movement is produced by a strong impact effected by a sturdy arm; the impact must be sufficiently strong in order for even a heavy log to turn sufficiently. An impact equally strong on all logs causes a distinct difference in their turning times, and the behavior of different logs is thus different. The impact device usually causes a bruise on the side of the log, and the bruise may even result in the non-acceptance of that section of the log for further processing. A log of a lower quality or, for example, a thin log may even break into two under the impact force. This, of course, causes financial losses. Another disadvantage due to the arrangement in question is even worse than the above in present efficient devices, namely, lowered capacity. When logs are given an impact by which even heavier logs certainly turn sufficiently, it is self-evident that lighter logs are ejected violently by the impact. As a result, a log hits the wall of the trough into which the intention is to direct it, and it rebounds from the wall to the other wall, etc., back and forth several times. It is evident that the next log will turn on top of the former before it has even fallen on the conveyor at the bottom of the trough, unless the interval between the logs is long enough. If it is desired to increase the handling rate, the impact force and impact rate must be increased, which results in additional difficulties in operation. Therefore, the rate of about 18 logs per minute is the maximum rate for this turning device.

Furthermore, from Finnish Patent No. 37 074 there is known a device by means of which the center of gravity of an oblong piece, for example a log, is determined by driving the log onto two rollers which have grooves in their longitudinal direction and rotate in opposite directions. In this case the movements of the log stop when its weight is divided equally on both rollers. The log is removed by arms of the type described above, which eject the log onto a conveyor which runs parallel to the rollers. To deter disturbances caused by the method of turning logs by an impact which always has the same force, there have been used long rollers similar to those in the device according to the invention described below. However, the purpose of the rollers has been to stop the log according to its center of gravity and not to effect the turning, as is evident from that which is stated above.

The present invention is based on the observation that the measures intended to speed up the turning have been developed unnecessarily far, and that return to an arrangement which seems less efficient surprisingly brings about a clear, for example, 50% increase in efficiency. Thus, the object of the present invention is to provide a method and device for changing the travel direction of a log and by means of which it is possible to obtain a considerably higher rate than with the previous turning device in such a manner that, for example, the logs do not come on top of each other or overlappingly on a conveyor transverse to the arrival direction of the logs, and that the turning procedure will not cause breakage of the logs or other damage. These advantages are gained by the method and device the main characteristics of which are given in the accompanying claims.

The invention is described below in greater detail with reference to the accompanying drawings, in which FIG. 1 depicts a side elevation of the log-turning device according to the invention, and FIG. 2 depicts a plan view of the same device.

The system has two rollers 2, which rotate in opposite directions. The rollers may consist of several parts in such a way that they have, at each end, usually longitudinally grooved parts 2a of uniform diameter, and between these parts, two parts 2b which protrude for example conically and delimit between them a depression 2c. The depression 2c and the protrusions 2b on its both sides easily guide the arriving log and prevent the log from returning during turning in cases of disturbance. The above-mentioned steps can, however, be carried out in some other way as well, in which case the rollers can be of continuously even thickness. The log arrives at the turning device at depression 2c and continues its journey, fed by a conveyor not shown here, until it is approximately in equilibrium on top of the rollers 2. At this time, for example, a blade 3 driven by drive cylinders 7 turns the log in such a way that the blades 3 quickly turn in different directions transverse to the longitudinal direction of the log, whereby the log is impelled along the horizontal plane, which directs it onto the rotating rollers 2, onto their parts 2a of uniform diameter, which, rotating in different directions, further bring the log into a horizontal turning movement and finally drop the log onto the conveyor 11. The conveyor 11 can be of any known type, e.g. a chain conveyor. The travel direction of the conveyor can be in either direction, i.e. either to the right or to the left in the figure. Reference numerals 5 and 6 indicate the vibration attenuators of the device.

The pushing direction of the blades 3 can be selected as desired, in which case the direction can be selected, for example, according to whether it is desired to bring the log onto the conveyor 11 with its base end or its top end first. The turning direction of the log is determined automatically by means of devices known in the art, whereby the time of turning is also determined automatically and at such a point that the log is not strongly weighted at the front or at the back and will not therefore pass elsewhere than into the trough or onto the conveyor. When desired, the operation can be manual.

Each roller 2 has its drive mechanism, usually an electric motor 8, which rotates the roller 2 by transmission of a chain or V-belt or cogged belt 9 and a sprocket wheel or belt pulley 10 at the end of the roller 2. The rotating system can also be hydraulic. The rotational velocity of the rollers can be selected as desired, it being sometimes advantageous to use a gear system located after the motor 8.

By means of the arrangement according to the invention it has thus been possible to achieve clearly higher operating rates than by prior known turning system. By means of the arrangement according to the invention it is possible to turn as many as 30 logs per minute, which must be regarded as a considerable improvement in the art. This has made it possible to use only one turning device instead of two, a factor which offers quite new possibilities in the design of log handling equipment, and also the practical construction of the equipment has become simpler and less expensive. The achieved rate is due to the fact that at the first stage the log is turned onto the rollers by the inner edges of the blades to a somewhat oblique position, the rollers 2 carrying out the second stage of the turning, during which each log turns, regardless of its size, always at the same speed and in a controlled way, onto the conveyor 11, and does not bounce back and forth in the trough 14. Thus the intervals between the logs can be shorter than before, since the preceding log will come out of the way more quickly. In a log-turning device according to the invention, logs therefore less often come on top of each other or overlap each other.

The blades 3 can, as said above, turn in either direction, whichever is desired, and therefore all of the logs can arrive at the next station with their base end or top end first. The blades are V-shaped and the sides of the V form an angle which is approximately a right angle. If so desired, the sides of the V can form, for example, an angle between 60° and 120°. The inner sides of the blades can be shaped as desired, as clearly shown in FIG. 1. Thus, one reason for the design is to make the blade 3 equally suitable for turning both small and large logs. Thus, it can be seen in FIG. 1 that the inner sides of the blades have been provided with two depressions, one on top of the other, the lower one handling small logs and the upper one handling large logs. When turning a log, the blades are moved about a shaft 13 which is below them, by means of their drive mechanisms 7. It suffices that a blade turns close to the vertical position, in which case the push can be quite slow, or it may move as little as 30°, if the push is rather quick. Usually the turning angle of the blades is about 30°–50°. Since the distance between the blades is rather short compared with the length of the log, turning is effective even with a short blade movement, when both blades move in such a way as to give the log a parallel power component. Thus it suffices that the log turns through only about 10°–20°, whereafter the rollers 2 assume the turning of the log and drop the log along inclined surfaces 4 into the trough 14, at the bottom of which, owing to the controlled drop, it remains without bouncing and from where the conveyor 11 conveys it away.

In considering the turning angle of the blades 3 and the minimum or maximum angle through which the log has to turn in order for the best possible result to be obtained, it is necessary to take into account, for example, the distance of the rollers from each other. It is thus evident that, if the device is operated with a rather long distance between the rollers, the turning angle, which is naturally dependent on the length of the arm to be turned, will be different than with a short distance between the rollers. Also, the turning angle of the V-shaped blade is strongly dependent on the turning speed. When the movement is stronger, a smaller turning angle can be used, and when the movement is slower, the log must be "accompanied" farther. The guide values given above for the turning angles serve as one alternative for the structure in the accompanying patent drawings, the dimensions of which are evident to an expert in the art, but they are not intended as any absolute values.

I claim:

1. Apparatus for changing the direction of a generally horizontally traveling log moving in a longitudinal direction relative to its axis comprising: a pair of spaced-apart oppositely rotating rollers disposed in fixed locations with their axes permanently transverse to the direction of log travel, each of said rollers having two spaced-apart protruding conical portions defining between them a log-receiving depression having inclined sides which extend upwardly and outwardly toward the ends of the respective roller and each roller having end portions of uniform diameter; a pair of generally V-shaped blades one of which is located upstream of the pair of rollers and the other of which is located downstream of the pair of rollers, with regard to the direction of log travel; and means for rotating the blades in opposite directions about axes parallel to the direction of log travel, the arrangement of the blades being such that upon rotation in opposite directions they push horizontally on the log in opposite directions thereby swinging the log through a small arc whereupon the log becomes engaged with the end portions of the rollers and is further swung by the action of the rollers on the log.

* * * * *